(12) United States Patent
Yang et al.

(10) Patent No.: US 9,279,556 B2
(45) Date of Patent: Mar. 8, 2016

(54) GUIDE LAMP APPARATUS FOR VEHICLE

(71) Applicant: Hyundai Motor Company, Seoul (KR)

(72) Inventors: Jeong Gyu Yang, Yongin-si (KR); Hye In Park, Masan-si (KR); Jin Ho Na, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 14/045,535

(22) Filed: Oct. 3, 2013

(65) Prior Publication Data

US 2015/0023043 A1 Jan. 22, 2015

(30) Foreign Application Priority Data

Jul. 16, 2013 (KR) .................. 10-2013-0083717

(51) Int. Cl.
*F21S 8/10* (2006.01)
*B60Q 1/22* (2006.01)
*B60Q 1/34* (2006.01)
*B60Q 1/50* (2006.01)

(52) U.S. Cl.
CPC ............ *F21S 48/2212* (2013.01); *B60Q 1/22* (2013.01); *B60Q 1/34* (2013.01); *B60Q 1/50* (2013.01); *F21S 48/215* (2013.01); *B60Q 2400/50* (2013.01)

(58) Field of Classification Search
CPC ..... F21S 48/2212; F21S 48/20; F21S 48/215; B60Q 1/22; B60Q 1/50; F21V 5/02; F21V 5/008

USPC .............................. 362/311.02, 520, 521, 522
See application file for complete search history.

(56) References Cited

U.S. PATENT DOCUMENTS

| | | | |
|---|---|---|---|
| 4,859,043 A * | 8/1989 | Carel et al. | 359/742 |
| 5,758,940 A * | 6/1998 | Ogino et al. | 353/38 |
| 8,033,697 B2 * | 10/2011 | Fang et al. | 362/466 |
| 2005/0254251 A1* | 11/2005 | Chou | 362/494 |
| 2013/0250601 A1* | 9/2013 | Ito | 362/544 |

FOREIGN PATENT DOCUMENTS

| | | |
|---|---|---|
| JP | 9-120067 A | 5/1997 |
| JP | 2001-194602 A | 7/2001 |
| JP | 2008-155767 A | 7/2008 |
| JP | 2011-16383 A | 1/2011 |
| JP | 2013-26161 A | 2/2013 |
| KR | 1999-019593 A | 3/1999 |
| KR | 10-2009-0032900 A | 4/2009 |

* cited by examiner

*Primary Examiner* — Laura Tso
(74) *Attorney, Agent, or Firm* — Morgan, Lewis & Bockius LLP

(57) ABSTRACT

A guide lamp apparatus for a vehicle may include a light source, a light division lens that may be arranged on a front of the light source and divides a light emitted from the light source into a plurality of lights, and a front light collection lens that may be arranged on a front of the light division lens and forms predetermined patterned images on a road surface.

10 Claims, 5 Drawing Sheets

GUIDE LAMP APPARATUS FOR VEHICLE

CROSS-REFERENCE TO RELATED APPLICATION

The present application claims priority to Korean Patent Application No. 10-2013-0083717 filed Jul. 16, 2013, the entire contents of which is incorporated herein for all purposes by this reference.

BACKGROUND OF THE INVENTION

1. Field of the Invention

The present invention relates to a guide lamp apparatus for a vehicle, and more particularly, to a guide lamp apparatus for a vehicle capable of dividing light from one light source into a plurality of light to form patterned images on a road surface when a turn signal guide lamp or a rear-moving guide lamp operates.

2. Description of-Related Art

Generally, a guide lamp provided on a vehicle is classified mainly as a turn signal guide lamp and a rear-moving guide lamp wherein the turn signal guide lamp is operated by an operation of a multifunction switch by a driver for serving to notify a lane change or an advancing-direction of a vehicle on a crossway to other vehicles while driving, and the rear-moving guide lamp serves to light a rear of a vehicle when a driver operates a shifting lever to a reverse stage (R) and also to notify an intention to move in reverse to other vehicles that are driving next to or behind a vehicle.

However, according to a guide lamp of a conventional art, the light from a source is illuminated simply outside through a lens and when vehicles moving behind are disposed in a dead zone where drivers of the vehicles that drive on a side or rear of a forward moving vehicle cannot see a guide lamp of the forward moving vehicle, the drives cannot recognize whether the guide lamp is operating or not, and in a more serious case, the drivers cannot identify the intention of a lane change or a change to a reverse direction of the forward moving vehicle, thereby causing accidents.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a guide lamp apparatus for a vehicle in which when a driver operates a guide lamp of a vehicle, the light emitted from a light source is divided into a plurality of lights to form predetermined patterned images on a road surface in a direction in which the vehicle is advancing and thus provide obviously the advancing direction for drivers of other vehicles that are driving in the side or rear side of the vehicle, thereby improving safety and reducing accident risk.

In an aspect of the present invention, a guide lamp apparatus for a vehicle, may include a light source, a light division lens that is arranged on a front of the light source and divides a light emitted from the light source into a plurality of lights, and a front light collection lens that is arranged on a front of the light division lens and forms predetermined patterned images on a road surface.

The guide lamp apparatus for the vehicle may further include a rear light collection lens that is arranged between the light source and the light division lens to collect the light from the light source to improve a light efficiency.

The guide lamp apparatus for the vehicle may further include a lamp housing in which the light source, the rear light collection lens, the light division lens, and the front light collection lens are fixed sequentially.

The front light collection lens and the rear light collection lens are convex lens.

The light division lens is a prism lens.

The light division lens may include an incident face facing the light source, a front plain face that is formed at a front of the incident face in parallel to the incident face and may have a smaller sectional area than the incident face, and a first inclined face and a second inclined face that connect the incident face and the front plain face, respectively.

The light division lens is formed with a sectional shape of a wedge wherein a sectional area thereof is decreased gradually from the incident face to the front plain face.

The front plain face and the first and second inclined faces of the light division lens correspond to a light emitting face facing the front light collection lens.

The light from the light source is divided into three lights through the front plain face and the first and second inclined faces to be illuminated on the road surface.

The lamp housing is fixed to a vehicle body and directed toward a front, rear or a side of the vehicle, and the light source, the rear light collection lens, the light division lens and the front light collection lens are fixed to the lamp housing and tilted at a predetermined angle toward the road surface in order that the light from the light source is divided into the plurality of lights and then is illuminated on the road surface in a direction to which the vehicle advances.

The lamp housing provided with the light source, the rear light collection lens, the light division lens and the front light collection lens is fixed to a vehicle body and directed toward a front, rear or a side of the vehicle in order that the light from the light source is divided into the plurality of lights and then is illuminated on the road surface in a direction to which the vehicle advances.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
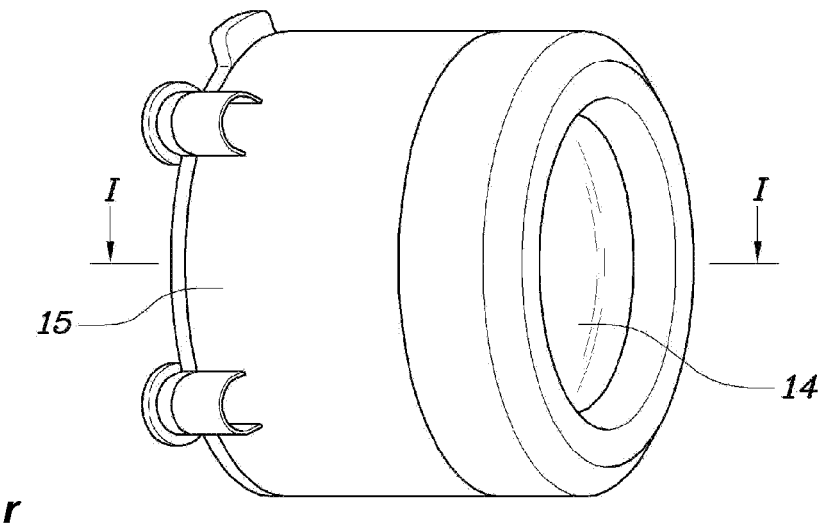
FIG. 1 is a perspective view showing a guide lamp apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter a guide lamp apparatus for a vehicle according to an exemplary embodiment of the present invention will be described, referring to the accompanying drawings.

A guide lamp apparatus according to an exemplary embodiment of the present invention, as shown in FIGS. 1 to 4, includes: a LED light source 11, a rear light collection lens 12 that is arranged on a front of the light source 11 and collects light from the light source 11 for improving light efficiency, a light division lens 13 that is arranged on a front of the rear light collection lens 12 and divides the light from the light source 11 into a plurality of lights, and a front light collection lens 14 that is arranged on a front of the light division lens 13 and forms predetermined patterned images 31, 32, 33 on a road surface 21 disposed in a forward direction of a vehicle by using the light from the light source 11, which is divided into a plurality of lights.

Additionally, the guide lamp apparatus according to an exemplary embodiment of the present invention further includes a lamp housing 15 in which the light source 11, the rear light collection lens 12, the light division lens 13 and the front light collection lens 14 are fixed sequentially.

Here, the lamp housing 15 is fixed to a vehicle body directed toward a front/rear or a side of the vehicle in order that the light from the light source 11 is divided into a plurality of lights and then is illuminated on the road surface 21 in a direction to which the vehicle advances wherein the light source 11, the rear light collection lens 12, the light division lens 13 and the front light collection lens 14 may be fixed to the lamp housing 15 tilted at a predetermined angle toward the road surface 21.

Otherwise, the lamp housing 15 itself may be fixed to a vehicle body and tilted at a predetermined angle toward the road surface 21, which is provided with the light source 11, the rear light collection lens 12, the light division lens 13 and the front light collection lens 14, in order that the light from the light source 11 is divided into a plurality of lights and then is illuminated on the road surface 21 in a direction to which the vehicle advances.

The front light collection lens 14 and the rear light collection lens 12 may be convex lens, and the light division lens 13 may be a prism lens, however, other types of lens may be used as the light division lens, provided that they can divide the light into a plurality of lights, in addition to the prism lens.

Meanwhile, the light division lens 13 is provided with an incident face 13a facing the light source 11, a front plain face 13b that is formed at a front of the incident face 13a in parallel to the incident face 13a and has a smaller sectional area than the incident face 13a, and a first inclined face 13c and a second inclined face 13b that connect the incident face 13a and the front plain face 13b, respectively.

That is, the light division lens 13 is formed with a sectional shape of a wedge type wherein the sectional area is decreased gradually from the incident face 13a to the front plain face 13b. Here, the front plain face 13b and the first and second inclined faces 13c, 13d correspond to a light emitting face facing the front light collection lens 14, and the light from the light source 11 is divided into three lights through the front plain face 13b and the first and second inclined faces 13c, 13d to be illuminated on the road surface 21.

If the light emitting face of the light division lens 13 is provided with more faces in addition to the front plain face 13b, and the first and second inclined face 13c, 13d, the light from the light source 11 may be divided into more than three lights to be illuminated on the road surface 21.

Hereinafter, operations of the exemplary embodiments of the present invention will be described.

Figure 3:
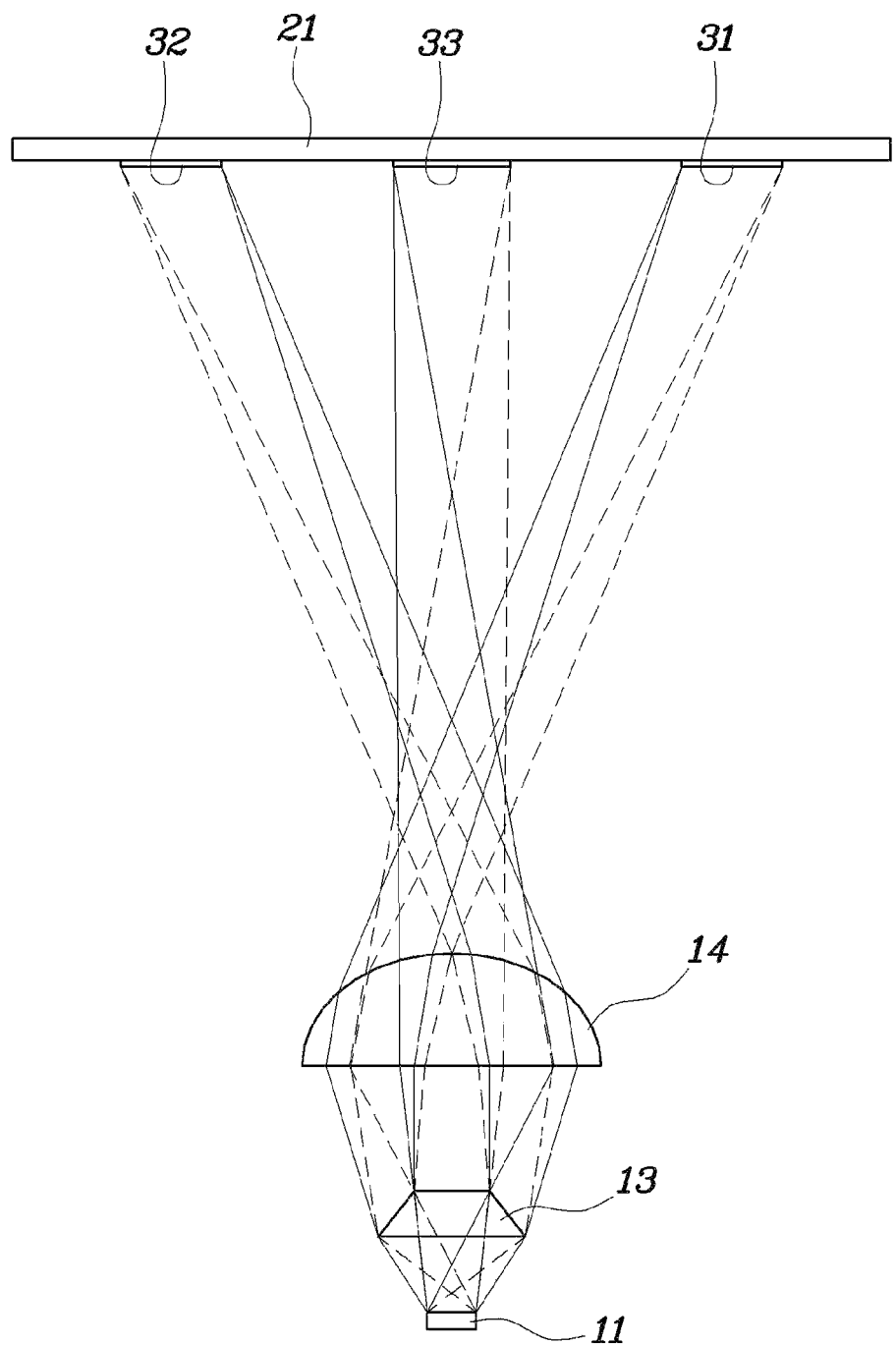
FIG. 3 is a view showing a state where a light from a light source is divided into three lights through a light division lens to be illuminated on a road surface according to an exemplary embodiment of the present invention.

In FIGS. 3 and 4, it is shown that the light emitted from one light source 11 is divided into three lights through the light division lens 13 to be illuminated on the road surface and three images 31, 31, 33 are formed on the road surface 21 through the light paths.

Figure 4A:
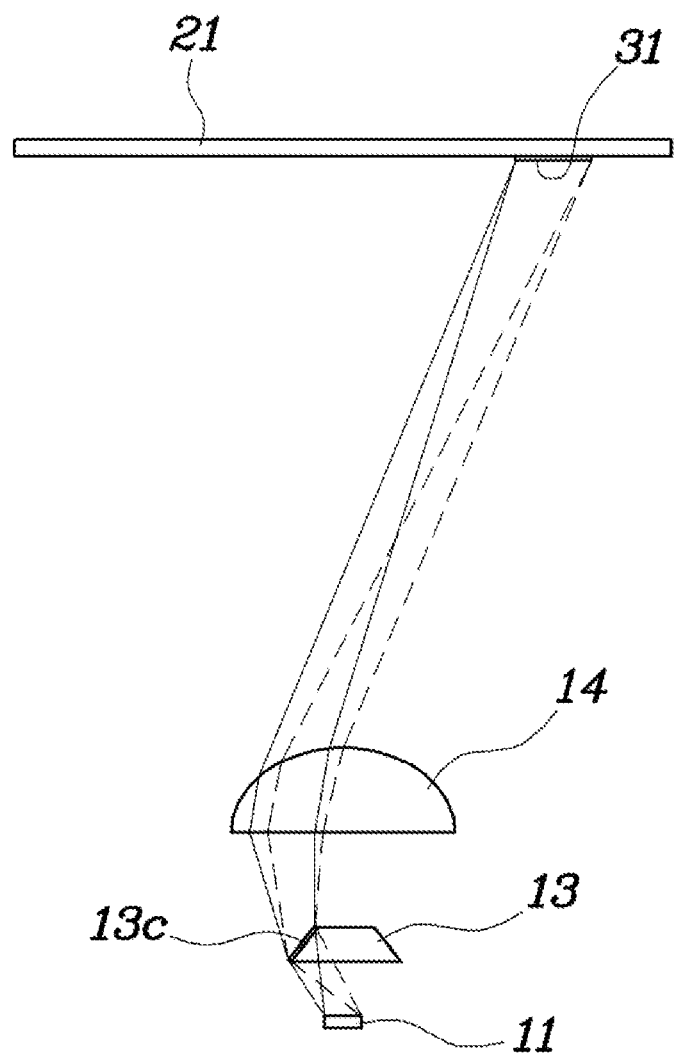
FIG. 4A is a view showing illumination paths of three divided lights.

That is, the light from the light source 11 passes through the light division lens 13 to be divided into three lights wherein as shown in FIG. 4(A), the light from the light source 11 that passed through the first inclined face 13c of the light division lens 13 is collected and refracted while passing through a left side of the light collection lens 14 to form a first image 31 on a right side of the road surface 21.

Figure 4B:
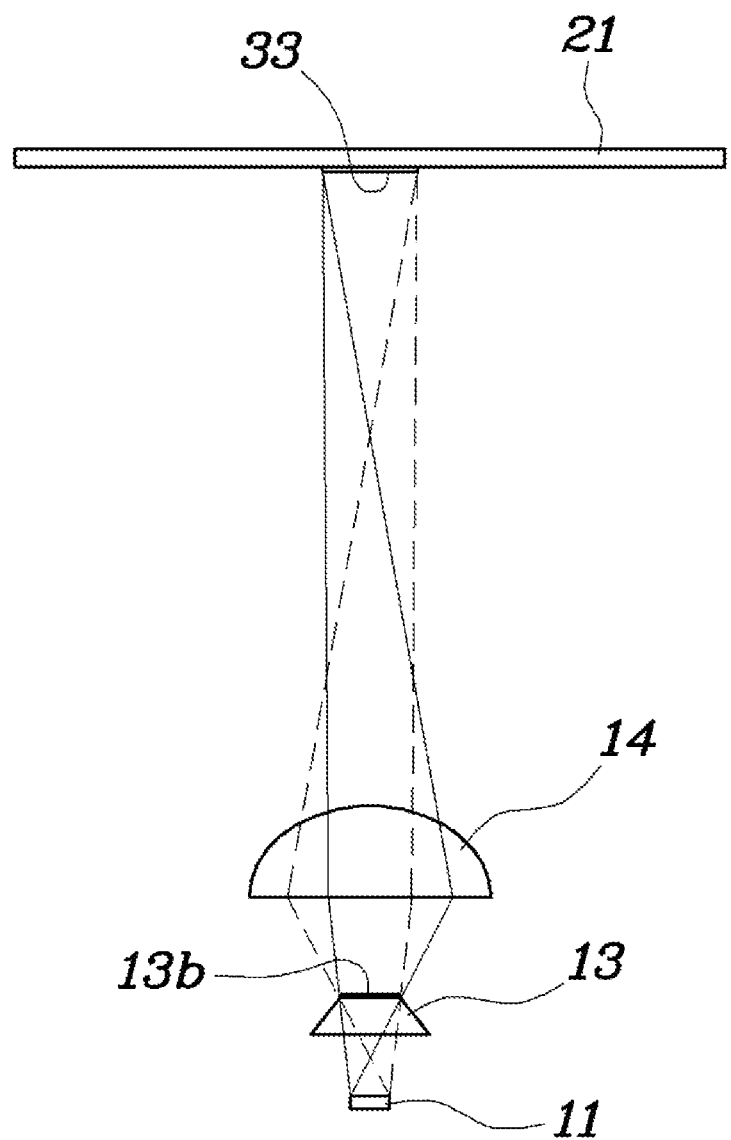
FIG. 4B is a view showing illumination paths of three divided lights.
Figure 4C:
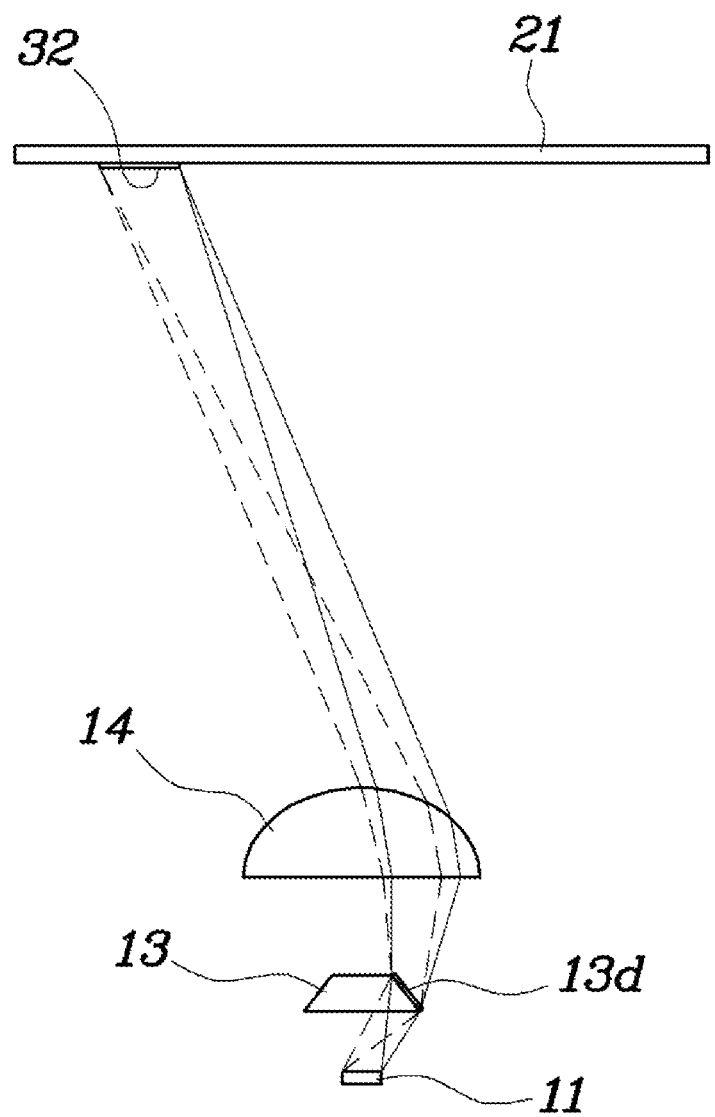
FIG. 4C is a view showing illumination paths of three divided lights.

Furthermore, as shown in FIG. 4(C), the light from the light source 11 that passed through the second inclined face 13d of the light division lens 13 is collected and refracted while passing through a right side of the light division lens 14 to form a second image 32 on a left side of the road surface 21.

Further, as shown in FIG. 4(B), the light from the light source 11 that passed through the front plain face 13b of the light division lens 13 is collected and refracted while passing through a center of the front light collection lens 14 to form a third image 33 on the road surface 21 corresponding between the first image 31 and the second image 32.

Figure 2:
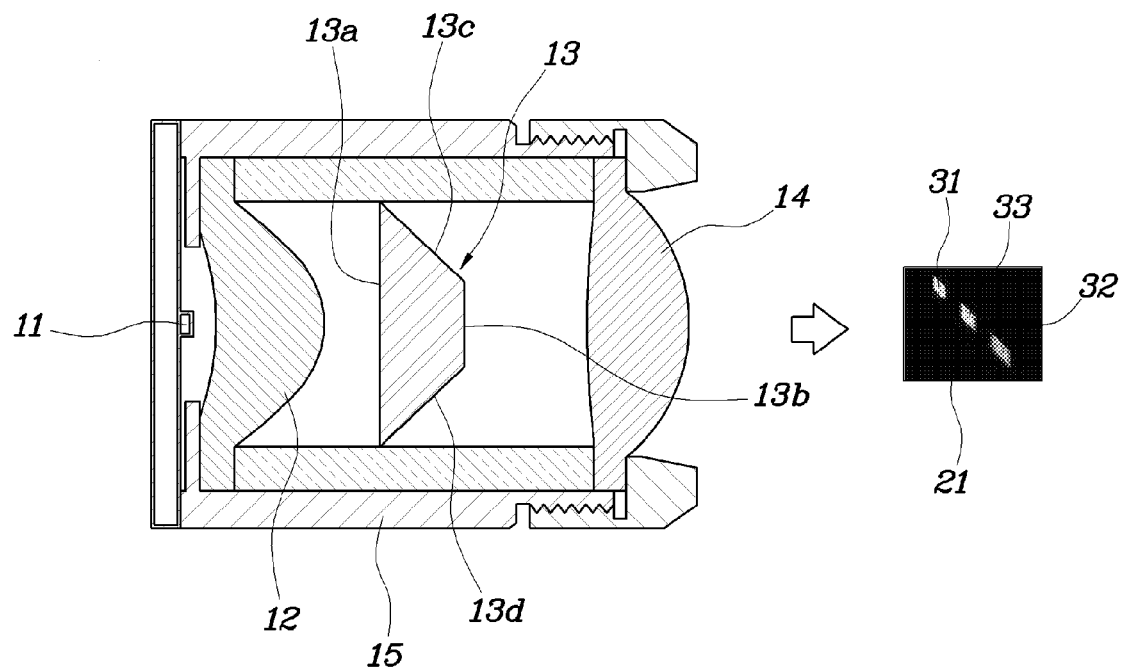
FIG. 2 is a cross-sectional view taken along I-I of FIG. 1 and a picture of patterned images formed on a road surface with illumination of a light source that is divided into a plurality of lights.

For reference, the right drawing of FIG. 2 is a partial picture showing that the light from the light source 11 is divided into three lights to form three images 31, 32, 33 on the road surface 21 when the light division lens provided with the front plain face 13b, and the first and second inclined faces 13c, 13d is used.

According to the guide lamp apparatus of the exemplary embodiment of the present invention, the images 31, 32, 33 divided into a plurality of images are formed on the road surface 21 in a direction to which a vehicle advances by using one light source 11, and thus other drivers of vehicles that drive at a side or rear can identify easily the forward direction of the vehicle by seeing the predetermined patterned images 31, 32, 33 formed on the road surface 21.

That is, when a turn signal guide lamp is operated for changing lanes or going through a crossway, or a reverse moving guide lamp is operated for driving in reverse, the light from the light source 11 is divided into a plurality (three) of lights while passing through the light division lens 13 to form a plurality of images 31, 32, 33 on the road surface 21 that is disposed in the forward direction of a vehicle.

Accordingly, even when other vehicles are disposed in a dead zone where the drivers of the other vehicles that drive on a side/rear of a forward moving vehicle cannot see directly the signal guide lamp or a reverse-moving guide lamp of the forward moving vehicle, the drivers of the other vehicles can identify the intention of the lane changing or the reverse moving of the driver by seeing the specific images 31, 32, 33 formed on the road surface 21, thereby improving safety and preventing an accident of the vehicle.

According to an exemplary embodiment of the present invention, the light from one light source is divided into a plurality of lights while passing through a light division lens to form a plurality of images on a road surface in a direction to which a vehicle advances so that the drivers of the other vehicles that drive on a side/rear of a forward moving vehicle can identify the intention of the lane changing or the reverse moving of the driver with seeing the predetermined patterned images formed on the road surface, thereby improving safety and reducing risk of an accident of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A guide lamp apparatus for a vehicle, comprising:
a light source;
a light division lens that is arranged on a front of the light source and divides a light emitted from the light source into a plurality of lights; and
a front light collection lens that is arranged on a front of the light division lens and forms predetermined patterned images on a road surface,
wherein the light division lens comprises:
an incident face facing the light source;
a front plain face that is formed at a front of the incident face in parallel to the incident face and has a smaller sectional area than the incident face; and
a first inclined face and a second inclined face that connect the incident face and the front plain face, respectively.

2. The guide lamp apparatus for the vehicle of claim 1, further comprising a rear light collection lens that is arranged between the light source and the light division lens to collect the light from the light source to improve a light efficiency.

3. The guide lamp apparatus for the vehicle of claim 2, further comprising a lamp housing in which the light source, the rear light collection lens, the light division lens, and the front light collection lens are fixed sequentially.

4. The guide lamp apparatus for the vehicle of claim 2, wherein the front light collection lens and the rear light collection lens are convex lens.

5. The guide lamp apparatus for the vehicle of claim 1, wherein the light division lens is a prism lens.

6. The guide lamp apparatus for the vehicle of claim 1, wherein the light division lens is formed with a sectional shape of a wedge wherein a sectional area thereof is decreased gradually from the incident face to the front plain face.

7. The guide lamp apparatus for the vehicle of claim 1, wherein the front plain face and the first and second inclined faces of the light division lens correspond to a light emitting face facing the front light collection lens.

8. The guide lamp apparatus for the vehicle of claim 1, wherein the light from the light source is divided into three lights through the front plain face and the first and second inclined faces to be illuminated on the road surface.

9. The guide lamp apparatus for the vehicle of claim 3, wherein the lamp housing is fixed to a vehicle body and directed toward a front, rear or a side of the vehicle, and the light source, the rear light collection lens, the light division lens and the front light collection lens are fixed to the lamp housing and tilted at a predetermined angle toward the road surface in order that the light from the light source is divided into the plurality of lights and then is illuminated on the road surface in a direction to which the vehicle advances.

10. The guide lamp apparatus for the vehicle of claim 3, wherein the lamp housing provided with the light source, the rear light collection lens, the light division lens and the front light collection lens is fixed to a vehicle body and directed toward a front, rear or a side of the vehicle in order that the light from the light source is divided into the plurality of lights and then is illuminated on the road surface in a direction to which the vehicle advances.

* * * * *